Aug. 28, 1934.  G. VAN YAHRES  1,971,390
SOIL TREATING CARTRIDGE
Filed March 29, 1933

INVENTOR
George Van Yahres

Patented Aug. 28, 1934

1,971,390

UNITED STATES PATENT OFFICE 1,971,390

SOIL TREATING CARTRIDGE

George Van Yahres, Westbury, N. Y.

Application March 29, 1933, Serial No. 663,294

1 Claim. (Cl. 47—48)

This invention relates to improvements in means and methods of fertilizing ground around growing trees, and its leading object is to provide a fertilizing charge which will have a predetermined strength and value for a specific tree condition, and a holder for the charge, which will permit of the slow diffusion of the fertilizing material into the ground, and which will itself disintegrate.

Another object of the invention is to provide a cartridge containing a charge of fertilizing material of the required strength and value for a given tree or root condition, with means for varying the time period for the diffusion of the fertilizing material into the ground.

A further object of the invention is to provide a fertilizing cartridge which will be initially sealed to protect the contents, but which may be partially or wholly unsealed, leaving the ends and body secure against mass leakage of the material, but exposing numerous small openings, through which the material may be allowed to gradually escape into the soil, while the cartridge shell will be crushed by the normal expansion of the ground and will be absorbed as it disintegrates.

A still further object of the invention is the provision of a cartridge, which may be charged with benzine crystals, or any other suitable exterminating preparation, and then placed in the ground to exterminate moles and other obnoxious organic life.

With the above and other objects in view the invention consist in certain new and useful constructions, combinations, and arrangements of parts, clearly described in the following specification, and fully illustrated in the accompanying drawing, in which:—

Figure 1:
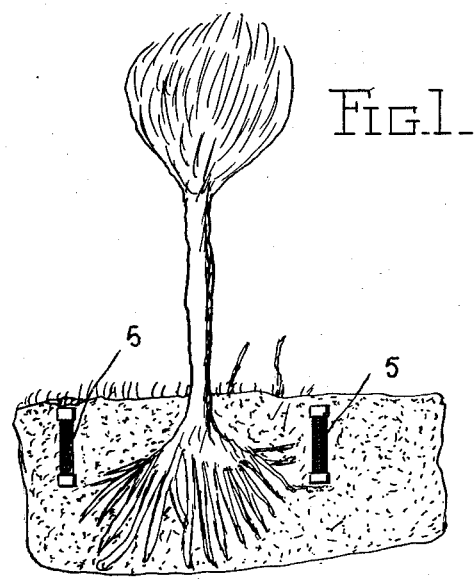
Fig. 1 is a view in vertical section through soil in which a plurality of cartridges have been inserted, adjacent a tree to be treated.

Referring to the accompanying drawing illustrating the practical application and embodiment of my invention 5 designates the cylindrical wall of the cartridge shell, the ends of which are closed by the caps 6 and 7. The shell is preferably constructed entirely of paper stock, and the cylindrical body wall 5 is preferably formed with a series of small holes 8, suitably spaced apart from each other.

The cartridge shell is filled with a charge of fertilizing material 9, and a packing or wad of moss 10 is placed in each end of the tubular wall 5, so as to absorb moisture and keep the fertilizing material in the best condition for gradual absorption by the soil.

The cartridge shell is charged with a predetermined quantity of fertilizing material of measured strength and suited for a given tree condition; the end wads of moss placed in position and then the end caps secured in place, by the use of suitable adhesive. Around the perforated body wall 5 a wrapper 11 is then wound, to completely enclose the perforations.

Two or more layers of wrapping material may be used, in which case the primary or first wrapper may be composed of porous material of low structural strength, which will readily disintegrate, when the second or outer wrapper is removed.

The loaded cartridge is placed in a hole formed in the ground, at a suitable distance from the trunk of the tree, and the hole then filled in. The number of openings in the cartridge shell and the resistance of the material of which it is constructed, will control the time period required for the complete absorption of the contained charge. By varying the number of openings of the cartridge shell, or by varying the resistance of the material of which the paper or fibre container is made, the time period of the soil absorption of the charge of the cartridge may be increased or decreased.

The slow absorption of the fertilizing material prevents the killing or scorching of the tender roots, and permits of a slow or prolonged combination with the soil and the growing roots. As the contents of the cartridge gradually exude through the perforations of the shell, the pressure of the swelling ground will aid the process of complete absorption. In the meantime the paper or fibre container will gradually disintegrate and become a part of the soil.

The cartridge shell may also be provided with partly pierced or weakened zones 12, so that the planter may completely pierce the same, to increase the outlets for the initial discharge of the fertilizing material.

The moisture of the ground is slowly absorbed by the cartridge shell and moisture penetrates through its many openings, so as to dissolve the fertilizing material, which more readily exudes through the openings of the shell.

Figure 2:
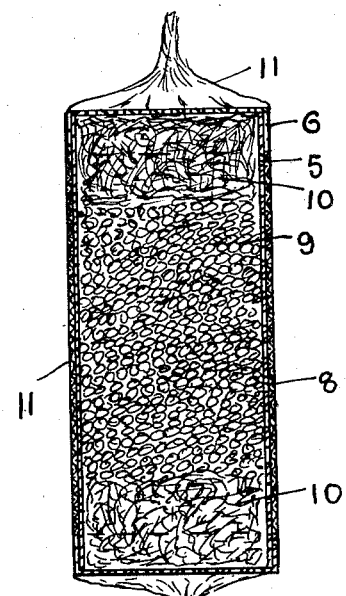
Fig. 2 is a longitudinal sectional view, on an enlarged scale, showing the perforated wall, the fertilizing charge and the wads of protecting moss at the ends thereof.
Figures 3, 3A:
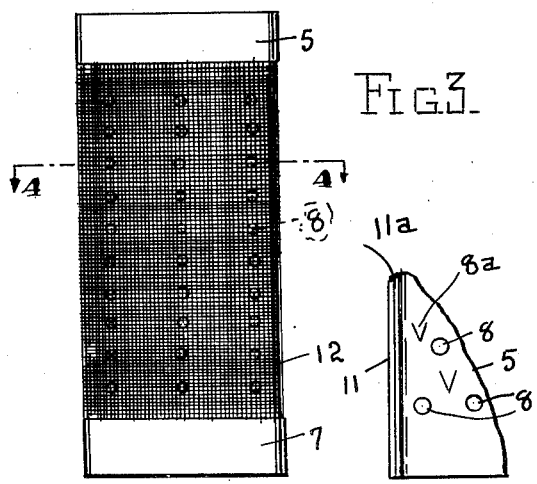
Fig. 3 is a side elevation, showing the protecting wrapper removed.
Fig. 3A is a fragmentary view of a modified container tube construction.

The wrapper 11, shown in Fig. 2 is intended to protect the cartridge, while it is under sale to the ultimate user, but the inner wrapper 11a may be made of softer paper or material, which will more readily disintegrate, and which may be left on the cartridge, when it is desired to delay the process of soil absorption of the fertilizing material or other plant or tree food used.

Figures 5, 6:
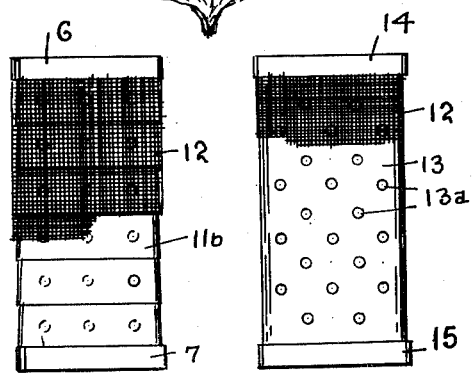
Fig. 5 is a side elevation of a modified form of the wrapper.
Fig. 6 is a side view of a cartridge for exterminating ground parasites.
Figure 4:
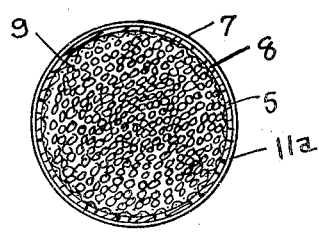
Fig. 4 is a cross sectional view thereof, taken on line 4—4 of Fig. 3, looking in the direction of the arrows.

The inner wrapper may also consist of a series of overlapping sections 11b, shown in Fig. 5, so that one or more of these sections may be removed, so that all of the perforated area of the tubular shell will not be exposed, and delayed absorption may be obtained in this way.

In Fig. 6 I show a cartridge, constructed with a perforated tubular shell 13 and the end closures or caps 14 and 15, which is provided with a charge of benzine crystals or other exterminating material. This cartridge is used for killing moles and similar ground parasites. This cartridge is inserted in a hole formed in the soil, which is then filled in, so that the ground will absorb the material, and any animal life coming in the zone thus treated will be killed.

Before the cartridge is inserted in the ground, it is dipped in water and then dropped in the hole prepared to receive it. Water is supplied to the soil around the hole at least once a week, in order to keep the plant food or fertilizing material in the best condition.

Having described my invention I claim as new:—

A fertilizing cartridge, consisting of a shell having a plurality of outlets formed in the same, a charge of fertilizing material in the shell, and wads of moisture holding moss in the shell.

GEORGE VAN YAHRES.